Oct. 26, 1965 RYO TOYABE ETAL 3,214,242
METHOD FOR HEATING POWDERY, GRANULAR RAW MATERIALS
Filed April 15, 1963 2 Sheets-Sheet 1
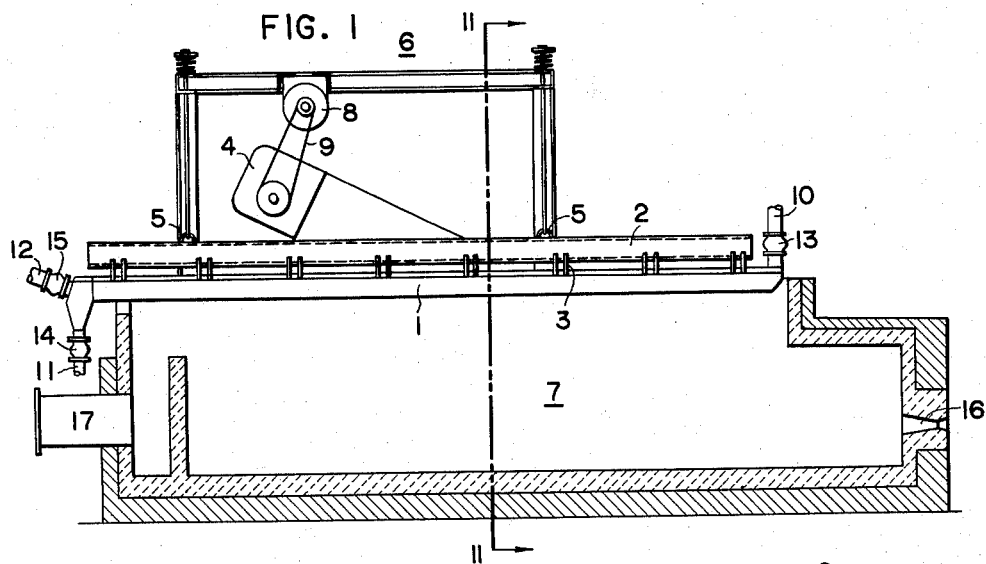
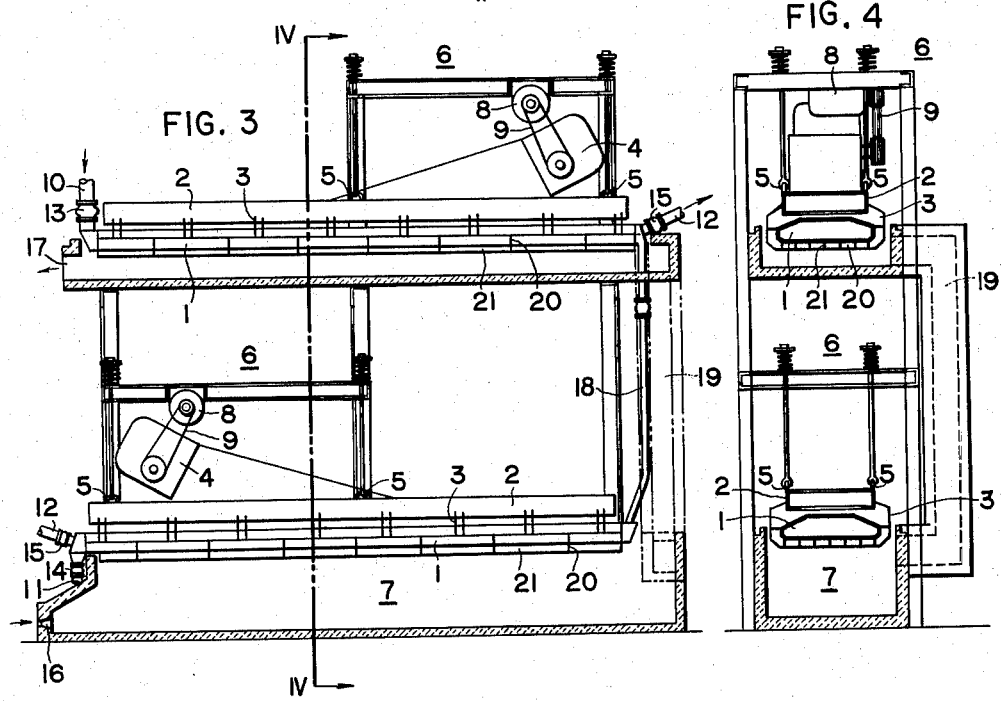

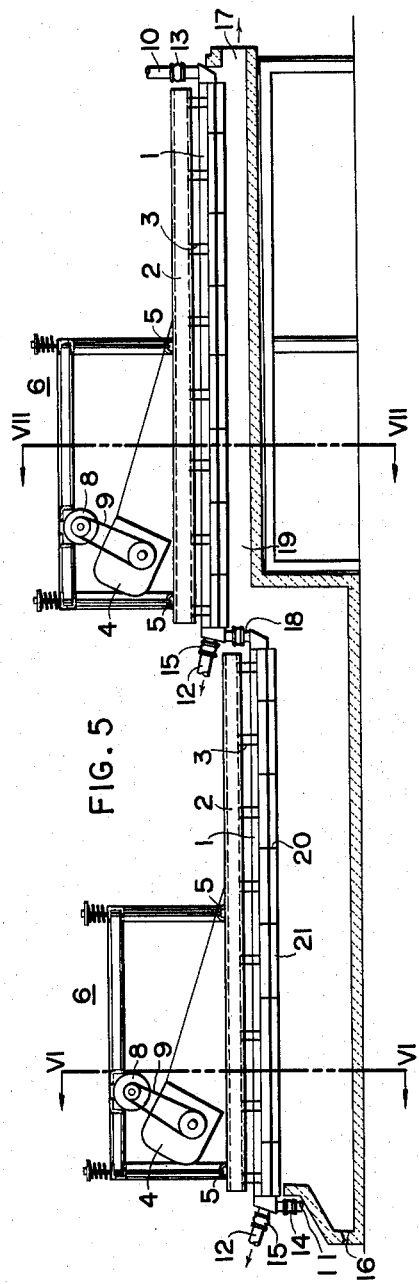
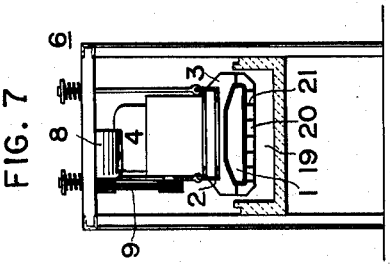
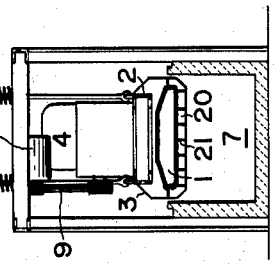
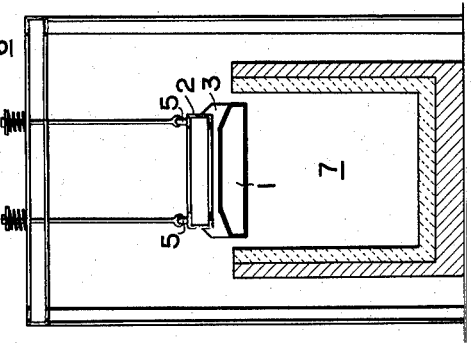

United States Patent Office 3,214,242
Patented Oct. 26, 1965

3,214,242
METHOD FOR HEATING POWDERY, GRANULAR RAW MATERIALS
Ryo Toyabe, Onoda, Yamaguchi Prefecture, Yoshiaki Onizuka, Funabashi, Chiba Prefecture, and Taro Yamaguchi, Tokyo, Japan, assignors to Onoda Cement Company, Limited, Onoda, Japan
Filed Apr. 15, 1963, Ser. No. 272,926
Claims priority, application Japan, Apr. 25, 1962, 37/15,916
3 Claims. (Cl. 23—153)

This invention relates to an apparatus and a method for heating powdery, granular raw materials such as sulfide ores, aluminum hydroxide, sodium bicarbonate, sodium hydrogen fluoride and gypsum which produce gaseous matters by heating them.

An object of this invention is to provide an apparatus and a method for heating the powdery, granular raw materials to cause them to have a high heat conductive coefficient and a high thermal efficiency.

Another object of this invention is to provide an apparatus and a method for heating powdery, granular raw materials by optionally controlling the heating temperature in order to prevent overheating.

Further, another object of this invention is to provide an apparatus constructed simple and compact for heating powdery, granular raw materials.

Still further, another object of this invention is to provide an apparatus especially suitable for heating powdery, granular raw materials which produce corrosive gaseous matters when heated.

The term "the powdery, granular raw materials" referred to in this specification means all such materials as those which produce gaseous matters by evaporation or decomposition of the substances included therein on heating them at an elevated temperature.

Hitherto, there have been proposed various types of the apparatus such as coke ovens and rotary kilns for heating raw materials to obtain gaseous matters therefrom and indirect heating procedures have been preferably practised for obtaining highly pure gaseous matters in order to utilize said gaseous matters for industrial purposes. In such a indirect heating procedure, it is always necessary that the apparatus is made compact by reducing the heat-transfer area as against capacity so that heat can be easily transmitted into a raw material through the heat-transfer surfaces.

In constructing the apparatus so compact it is necessary to increase its over-all coefficient of heat transfer and also to increase the temperature gradient between the temperature of the heat source and the temperature of the raw material to be heated. The increase of the temperature gradient between the temperature of the heat source and the temperature of the raw material, however is limited necessarily by the heat- and corrosion-resisting properties of the constructive materials of the apparatus as well as the thermal characteristics of the raw materials, and therefore researches and attempts have so far been directed to a way of increasing the over-all coefficient of heat transfer of the apparatus.

In the indirect heating apparatus, the overall coefficient of heat transfer generally consists of three factors, that is, the heat-transfer coefficient for the heating surface on the heat source side, the thermal conductivity and thickness of the heating surface itself, and the heat-transfer coefficient for the raw materials on the heating surface. Although the over-all coefficient of heat transfer is sometimes affected by the deposition of scale or soot on the both sides of the heating surface, however, such an ill-effect may be neglected in the normal running of the apparatus.

Although the heat-transfer coefficient for the heating surface on the heat source side is variable depending on the heating method, its value is after all relatively negligible compared with the other factors, especially when a combustible gas is used for heating. The thermal conductivity and thickness of the heating surface may be regarded as a negligibly small factor when compared with the two other factors, especially when the heating surface is made of metal.

The heat-transfer coefficient for the raw materials on the heating surface is the most important factor for the heating apparatus, and usually becomes the controlling factor of the apparatus. And this factor is thought to be affected mainly by an effective thermal conductivity, the specific heat and the thickness of the layer of raw materials to be heated.

In this invention, only the latter one factor out of said three factors, that is, the thickness of the layer of the raw materials is controlled and desired to be as thin as possible. This invention is particularly useful wherein corrosive raw materials are treated.

This invention has been achieved as the result of studies and reseaches made for accomplishing the aforesaid objects and provides an apparatus for heating powdery, granular raw materials for the recovery gaseous matters at an elevated temperature, said apparatus comprising a heating device, at least one trough mounted on the heating device and a vibrator connected with the trough for vibrating the trough in conveying the raw material charged into the trough from the inlet to the outlet thereof.

For a better understanding of the nature and objects of this invention, reference should be made to the following detailed description in connection with the accompanying drawings in which:

FIGURE 1 is a side elevational view of an embodiment of the apparatus of this invention;

FIGURE 2 is a II—II line cross-sectional front view of FIGURE 1;

FIGURE 3 is a side elevational view of another embodiment of the apparatus of this invention;

FIGURE 4 is a IV—IV line cross-sectional front view of FIGURE 3;

FIGURE 5 is a side elevational view of still another embodiment of the apparatus of this invention;

FIGURE 6 is a VI—VI line cross-sectional front view of FIGURE 5;

FIGURE 7 is a VII—VII line cross-sectional front view of FIGURE 5.

Referring now to FIGURES 1 and 2 in which 1 is a trough made of heat- and/or corrosion-resisting materials such as iron, aluminium, nickel, copper, chrome and their alloy, 2 is a frame made of metallic materials which is mounted on the trough 1. The trough 1 is connected with the frame 2 by any suitable means such as section steel 3 and the frame 2 is connected with a vibrator 4. The trough 1, the frame 2 and the vibrator 4 are suspended from frame work 6 by ring 5 on the frame 2 and they are mounted on heating device 7 such as a combustible gas oven. The space between the trough 1 and the heating device 7 is sealed with any suitable means such as water seal (not shown). 8 is a motor installed on the frame work 6 and the vibrator is operated by means of the motor 8 and belt 9. 10 is the inlet for a raw material, 11 is the outlet for a heat treated material and 12 is the outlet for a produced gaseous matter. Flexible chutes 13, 14 and 15 are assembled to the inlet 10 and the outlets 11 and 12 respectively. 16 is the inlet for a combustible gas and 17 is the outlet for a exhaust gas.

The raw material is charged into the trough 1 through the inlet 10 at a constant charging rate while the trough is heated by the heating device 7 and vibrated by the motion of the vibrator 4. The raw material is gradually heated and transferred to the outlet side from the inlet side by sliding smoothly on the bottom of the trough and the produced gaseous matter is recovered through the outlet 12.

In this case, the motion of the raw material can be varied freely by changing the factors such as the installed angle of the trough against the horizontal plane, the angle of incidence of the vibration, the frequency and amplitude of vibrations. And the thickness of the layer of the raw material on the trough can be varied by the charging rate thereof and the conveying rate thereof. The thickness of the raw material charged in accordance with this invention is preferable to control within the range of about from 5 to 10 millimeters.

The description mentioned above is for an example of an apparatus having one trough and using a combustible gas heating method. However, the heating device may be in the form of an electric heating means or a heat-transfer medium.

Referring now to FIGURES 3 to 7 in which an apparatus having two troughs situated on the heating device is shown. The upper trough 1 and lower trough 1 or the left hand trough and right hand trough are connected by the connection pipe 18. The combustion gas used for heating the upper trough or the combustion gas used for heating the left hand trough can be passed through a flue 19 to the second heating device for heating the lower trough or the right hand trough. 20 and 21 are the limbs or fins installed on the heat source side of the trough 1 longitudinally and transversally in order to increase the heat-transfer coefficient of the trough.

The above-mentioned vibrator is included for purpose of illustration only and is not indicative of the scope of this invention which is not limited to the particular condition.

In this invention, vibrating the trough can generally be actuated by the following mechanical vibrating or electromagnetic means in place of the said vibrator; (1) a high speed unbalanced pulley, (2) two unbalanced pulleys geared together so that the weights give a resultant rectilinear thrust, (3) electromagnetic vibrations from one or more solenoids, (4) electromagnetic vibrations by a reciprocating armature mounted between two pole pieces, (5) vibrations by the slower pulsation secured by a crank shaft or eccentric shaft connected to the plate mounted on rearward-inclined spring supports, or (6) their combinations.

Now a method for heating sodium hydrogen fluoride (NaHF$_2$) as a raw material by using the apparatus shown in FIGURES 1 and 2 is illustrated as follows:

Sodium hydrogen fluoride can be decomposed as shown in the following equation by heating it at a temperature of about 250° C. under the normal atmospheric pressure:

$$NaHF_2 \rightarrow NaF + HF \rightarrow 17.1 \text{ kcal./mol}$$

In this apparatus, the trough, the inlet pipe for sodium hydrogen fluoride and the outlet pipe for sodium fluoride and hydrogen fluoride gas are made of iron lined with Monel metal.

Sodium hydrogen fluoride is charged into the heating surface of the tough 1 having the flat bottom, of 5000 mm. length and 1000 mm. widths, through the inlet 10 of the apparatus. The trough is vibrated by the motion of the vibrator 4 having an angle of 26° of incidence of vibration, a vibration frequency of 740 per minute and a vibration amplitude of 3 mm. Sodium hydrogen fluoride on the heating surface of the trough has a thickness of about 10 mm. and is conveyed at a speed of 1300 mm. per minute while the outer surface of the trough is heated at the temperature of about 270° C. Hydrogen fluoride gas thus produced is induced to the cooling system through the outlet 12 and recovered as an anhydrous liquid fluoric acid having a concentration of 99.0 percent. The decomposition ratio of sodium hydrogen fluoride is about 90 percent. For long time, this apparatus is easily and uniformly operated.

By using the apparatus of this invention, the thickness of the layer of the raw material to be treated can be freely controlled not only by changing the feeding rate of said material but by changing the angle of incidence of vibration, the vibration frequency and the vibration amplitude and the raw material is uniformly distributed all over the surface and the overheating of the raw material can be easily prevented. And further, the apparatus of this invention can improve the heating efficiency because the heat-transfer coefficient of said raw material is large. Still further, the apparatus of this invention is simple in construction as it has no inner mechanism such as agitator or moving device and therefore it is suitable and efficient for heating powdery, granular materials, especially pro- 1. A method of producing hydrogen fluoride gas by What we claim is:

1. A method of producing hydrogen fluoride gas by heat decomposing sodium hydrogen fluoride which comprises charging granular sodium hydrogen fluoride in a thin uniformly distributed layer into a trough heated to a temperature effective to decompose said sodium hydrogen fluoride, transferring said sodium hydrogen fluoride smoothly and continuously from the inlet of said trough to the outlet of said trough while maintaining said sodium hydrogen fluoride in a thin uniformly distributed layer, by vibrating said trough and collecting the hydrogen fluoride product.

2. A method of producing hydrogen fluoride gas by heat decomposing sodium hydrogen fluoride which comprises charging granular sodium hydrogen fluoride in a uniformly distributed layer of about 5–10 mm. thickness into a trough heated to a temperature of the order of 270° C., transferring said sodium hydrogen fluoride smoothly and continuously from the inlet of said trough to the outlet of said trough while maintaining said sodium hydrogen fluoride in a thin, uniformly distributed layer, by vibrating said trough, and collecting the hydrogen fluoride product.

3. A method of producing hydrogen fluoride gas by heat decomposing sodium hydrogen fluoride which comprises charging granular sodium hydrogen fluoride in a uniformly distributed layer of about 5–10 mm. thickness into a trough heated to a temperature of the order of 270° C., transferring said sodium hydrogen fluoride smoothly and continuously from the inlet of said trough to the outlet of said trough at a speed of about 1300 mm. per minute while maintaining said sodium hydrogen fluoride in a thin, uniformly distributed layer, by vibrating said trough, and collecting the hydrogen fluoride product.

References Cited by the Examiner
UNITED STATES PATENTS

| 1,665,588 | 4/28 | Harshaw et al. | 23—153 |
| 2,021,072 | 11/35 | Machlet | 263—21 X |
| 2,082,970 | 6/37 | Overman | 263—21 |
| 2,189,194 | 2/40 | Brush | 263—21 |
| 2,521,591 | 9/50 | Martin | 263—21 |

CHARLES SUKALO, *Primary Examiner.*